United States Patent [19]

Zabler et al.

[11] 4,087,804

[45] May 2, 1978

[54] INFORMATION DISPLAY DEVICE

[75] Inventors: Erich Zabler, Karlsruhe; Frieder Heintz, Stutensee; Viktor Kopernik, Ettlingen, all of Germany

[73] Assignee: Robert Bosch GmbH, Stuttgart, Germany

[21] Appl. No.: 734,540

[22] Filed: Oct. 21, 1976

[30] Foreign Application Priority Data

Nov. 22, 1975 Germany .......................... 2552522

[51] Int. Cl.[2] .......................... G08B 5/00; B60Q 1/00

[52] U.S. Cl. .......................... 340/319; 340/52 F; 340/325; 340/379

[58] Field of Search .............. 340/319, 325, 373, 379, 340/334, 52 F; 40/104.01, 35, 30, 52 R, 53 R

[56] References Cited

U.S. PATENT DOCUMENTS

| | | | |
|---|---|---|---|
| 3,256,512 | 6/1966 | Pickett et al. | 340/334 |
| 3,501,761 | 3/1970 | Capellari | 340/325 |
| 3,916,375 | 10/1975 | Sumiyoshi et al. | 340/52 F |
| 3,928,846 | 12/1975 | Arai et al. | 340/379 |

*Primary Examiner*—Donald J. Yusko

*Attorney, Agent, or Firm*—Flynn & Frishauf

[57] ABSTRACT

A group of information carrying flaps are pivoted to the circumference of a drum so that, upon rotation of the drum, the flaps drop down, one by one; the flaps carry information conveying indicia, for example trouble indication during operation of a motor vehicle. The drum is rotated by a motor. To display a specific information item, that is, to permit a specific flap to drop, the flaps are formed with conductive portions which are coded at an edge, the edges being engaged by the holding springs. If the code, which preferably is a binary code, matches that of a binary number entered into one terminal of a comparator, to which the holding springs are connected, the motor is stopped, thus displaying the specific information carried on the flap having the code which matches that of the code entered into the comparator.

10 Claims, 5 Drawing Figures

INFORMATION DISPLAY DEVICE

CROSS REFERENCE TO RELATED APPLICATION

U.S. Ser. No. 722,969, filed Sept. 13, 1976, KIENKE et al; assigned to the assignee of the present application.

The present invention relates to an information display device, and more particularly to a display device which is small and can be mounted on the dashboard of a motor vehicle to indicate possible trouble, or operating conditions occurring in the motor vehicle. Specifically, the invention relates to a display device for use as an output element of the system disclosed and claimed in U.S. Ser. No. 722,969, filed Sept. 15, 1976, KIENKE et al., assigned to the assignee of the present application.

It has previously been proposed to convey information by entering the information on flaps which are selectively displayed. These flaps are located on a roller or drum and at least a portion thereof, in a certain rotational angle of the drum, is held by a holding spring. It has also been proposed to provide information display devices in which a drum is formed with flat surfaces to form, in essence, an elongated prism. The prism is hollow and transparent. Each one of the surfaces is formed as a transparent carrier, for example plastic or transparent paper, on which information is entered. A light source is located within the interior of the prismatic roller which illuminates the information carrying side from the inside. The prism is shielded from view, except for the surface where information is to be displayed. Upon rotation of the prism, one after the other of the surfaces will appear in the open window, for reading of the information.

This arrangement, while simple, has only limited application since the number of information items which can be placed on such a prism is limited and particularly so if the prismatic roller is to have a reasonable diameter and small enough to be mounted behind the dashboard of an automotive vehicle. Either the number of information items which can be carried is small or the diameter of the prismatic roller becomes large.

When conveying information, particularly operating or trouble information arising in motor vehicles, the number of information items to be displayed becomes much larger than that which can conveniently be carried on the circumference of a roller which has a diameter small enough so that it can be fitted behind the dashboard of a motor vehicle.

It is an object of the present invention to provide a display device in which a relatively large number of information items can be carried, which is small and requires little space, and which simultaneously provides for placement of the proper information item, as commanded by a command signal derived, for example, from a trouble sensing system.

Subject Matter of the Present Invention

Briefly, a number of drop flaps or vanes are located at the circumference of a drum to drop upon rotation of the drum. Each one of the flaps or vanes carries a code marking which can be scanned by holding springs for the vanes themselves. The code markings, for example in the form of conductive portions on the vane, the remainder of the vane being coated with an insulating material, are applied to a comparator to which a coded command signal is applied. Upon coincidence of the code sensed by the springs on a specific flap and the code derived from the command source, the drive motor for the roller is coded to be stopped; upon non-coincidence, the motor will rotate.

The invention will be described by way of example with reference to the accompanying drawings, wherein.

Figure 1:
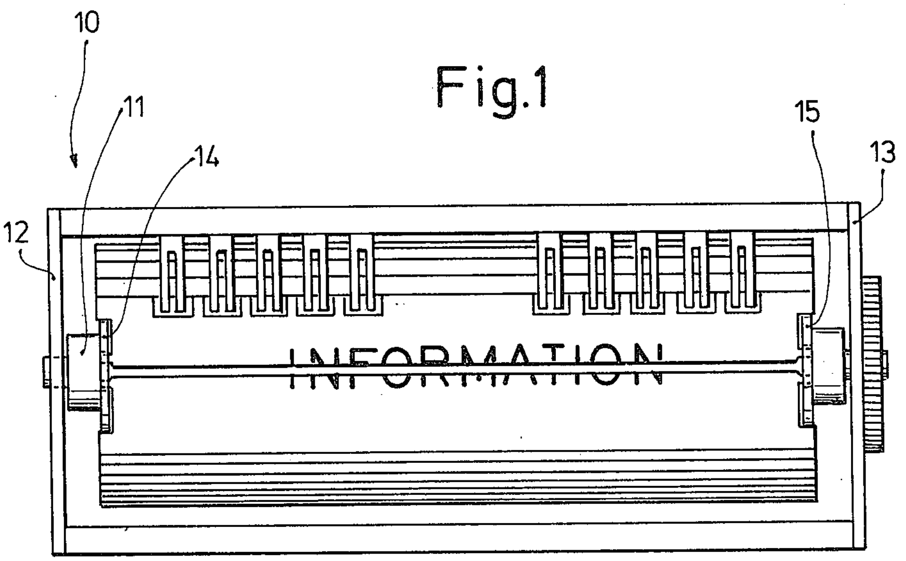
FIG. 1 is a schematic front view of the information display device, with the cover or window shielding all components except the information carrying portion itself being removed.
Figure 2:
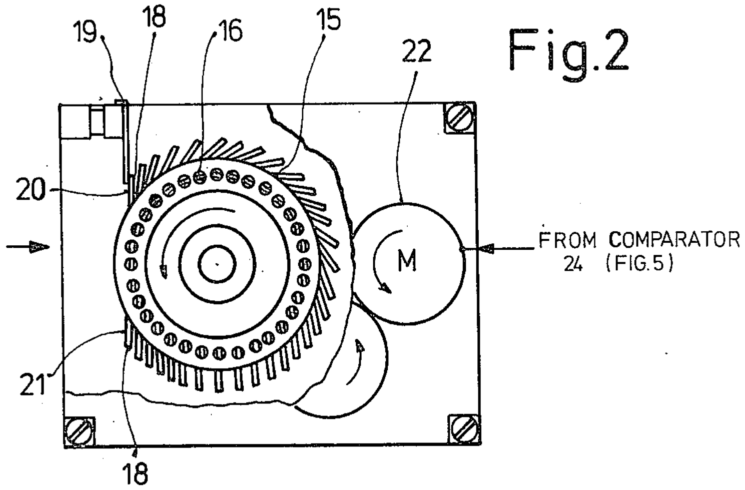
FIG. 2 is a side view, partly schematic and partly broken away, of the device of FIG. 1.
Figure 3:
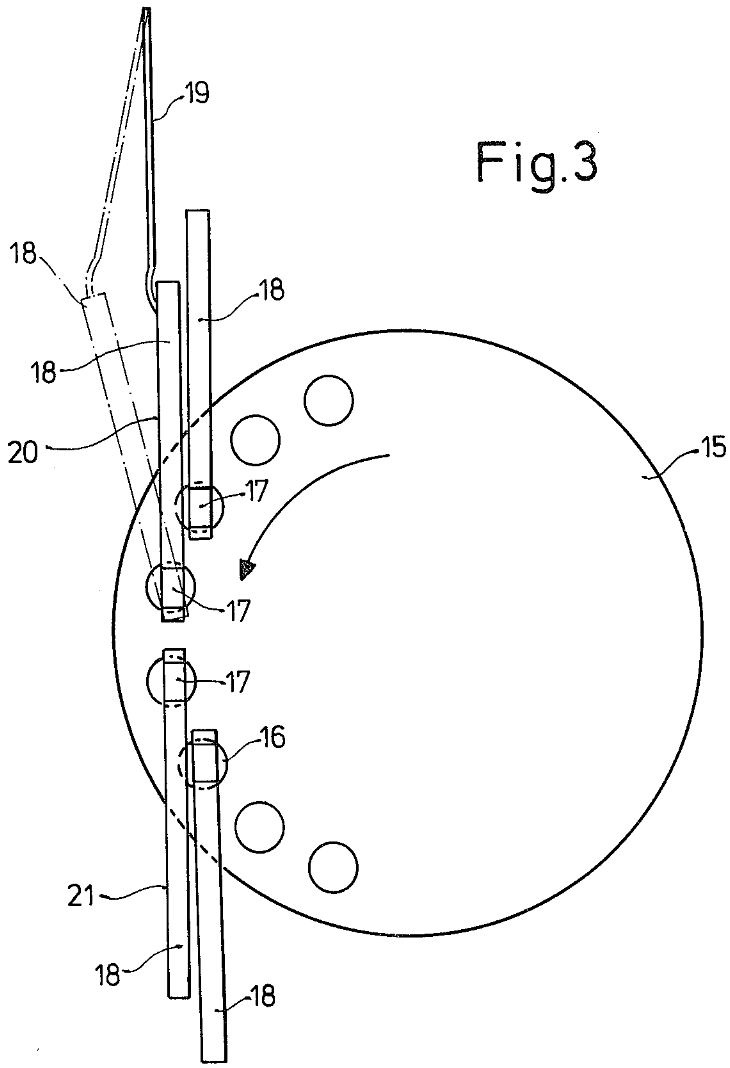
FIG. 3 is a schematic fragmentary side view to an enlarged scale.

A drum 10 (FIG. 1) has a central shaft 11 secured in side walls 12, 13 of the device. Shaft 11 carries two disks 14, 15 which, as best seen in FIG. 2, have holes placed along the circumference thereof. Pins 17 (FIG. 3, FIG. 4) of drop flaps 18 are located in the holes 16. The pins 17 of the drop flaps 18 can turn freely in the holes. The frontmost or forward drop flap 18, taken from the direction of viewing of the information display device, is held by holding springs 19. Information is carried on the front side 20 of the upper drop flap 18 and on the back side 21 of the immediately preceding, and then lower flap 18. The drum 10, together with the drop flaps 18, is rotatably journalled in the side walls 12, 13 and connected by suitable gearing to a drive motor 22 (FIG. 2). FIG. 3 clearly shows the arrangement of the drop flaps 18 in disk 15, and further, particularly well, describes the drop flap process of a drop flap 18. Upon rotation of the drum 10, holding spring 19 slightly deflects, permitting the foremost flap 18 to clear the spring, as shown in chain-dotted lines in FIG. 3.

Figure 4:
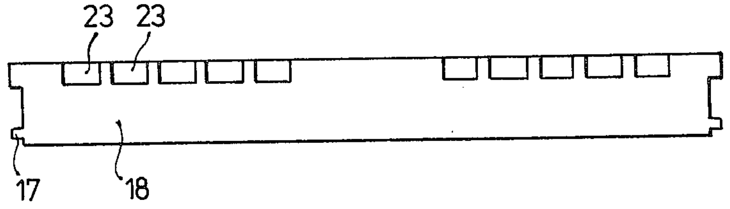
FIG. 4 is a schematic view of a single drop flap.

The individual drop flaps 18 are similar, and shown in FIG. 4. The drop flaps have electrical contacts 23 at their upper edge. These electrical contacts may be formed, for example, by removing insulating coating from the flaps, the flaps themselves being made of metal. If the insulating coating is removed at the positions 23, electrical contacts will arise at those positions with which the holding springs 23 can scan. The holding springs 19 are at least partly of electrically conductive material. Upon application of an electrical voltage to the springs 19 and the drop flaps 18, the coding placed on the specific drop flaps 18 can be used to identify a specific drop flap by varying the arrangement of locations of contacts 23 on the drop flaps. The drop flaps may be arranged, for example, in binary code.

Figure 5:
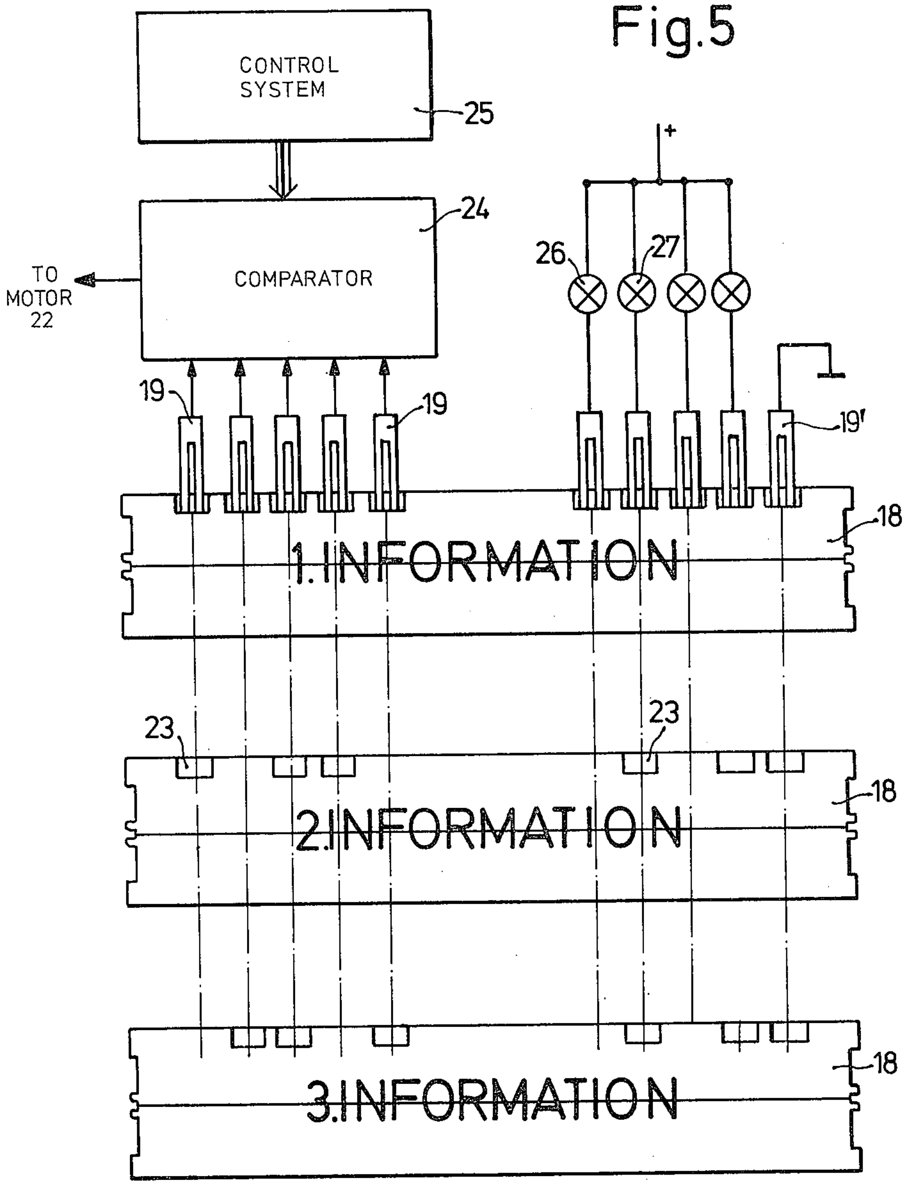
FIG. 5 is a schematic view of a plurality of code flaps, removed from the drum and aligned in accordance with placement of the drum, and showing connection of the code sensing elements to the comparator and associated equipment.

FIG. 5 illustrates three differently coded drop flaps; the different coding is obtained by changing the placement of the electrical contacts 23. The final contact, engaged by spring 19', provides a common ground connection for the drop flaps so that reliance need not be placed on the contact between the projecting pin 17 of any drop flap and the remaining structure of the device.

The various terminals 19 at the left side (FIG. 5) of the drop flaps are connected to one group of inputs of a binary comparator 24. Another group of inputs is connected to a control system 25 which supplies a command code controlling the particular drop flap which is to display information. The code sensed by the springs 19 at the left side of the drop flaps 18 is compared in comparator 24 with the command code. If the command code agrees with the code which is sensed by the springs 19, comparator 24 provides a STOP signal to motor 22, thus stopping shaft 10. If, however, the command code derived from the system 25 and the sensed code derived from springs 19 do not agree, motor 22 will continue to operate until agreement between the command code and the sensed code is obtained. The command code can be derived from a control system as disclosed in the above referred-to and cross-referenced application, for example to provide supervisory or monitoring signals monitoring the operating condition of elements in an automotive vehicle. If all components function properly, an "OK" output information can be displayed.

The drop flaps 18 carry codes in two groups. The group at the left side has been discussed; the group at the right side may be used to provide additional information by energizing, for example, warning lamps 26, 27 if specific malfunction signals have been sensed. This is particularly useful if different types of malfunction occurrences are assigned different priorities. Thus, the upper drop flap of FIG. 5, at its right side, carries a code which is different from the code of the two lower drop flaps 18 which both are associated with the same priority rank of indication. In accordance with the coding at the right side of the drop flaps, FIG. 5, the warning lamp 26 will light if, for example, the topmost drop flap 18 is commanded to display information. Upon display of the information carried on the second or third drop flap 18, lamp 27 will light. Rather than providing the warning lamps 26, different display devices for different types or groupings of malfunction indicia can be provided. The lamps 26, 27 etc. may, for example, have different colors.

Additional code markings can be provided, and the system can be reversed, that is, absence of contact can be used to control the comparator, rather than making of a contact of the spring 19. If the drop flaps are made of non-conductive material, a conductive strip with suitable terminals at the edge, engageable by the springs 19, can be provided.

Various changes and modifications may be made within the scope of the inventive concept.

We claim:

1. Information display device comprising a rotatable drum (10);

a motor (22) connected to rotate the drum;

a plurality of drop flaps (18) journalled at the circumference of the drum and carrying information indicia;

and a plurality of holding springs (19) having electrically conductive portions engaging the edges of the drop flaps as they become placed under the respective springs upon rotation of the drum, to retain the drop flaps vertically until continued rotation of the drum releases the topmost flap to drop and display information carried thereon the drop flaps (18) carrying coded electrical contacts (23) located at the edges of the flaps in predetermined positions, in accordance with a code assigned to individual flaps, the springs (19) being located to scan possible positions of contacts to engage the contacts on the flaps and provide flap code signals representative of the particular drop flap engaged by the springs;

and a comparator (24) having command signals applied thereto and being further connected to said springs (19) to have the flap code signals applied thereto representative of the flap code sensed, and providing a control output signal connected to and controlling rotation or non-rotation of the motor (22), selectively, based on the comparison between the code of the command signal and the code of the contacts of the flap then presently engaged by the springs.

2. Device according to claim 1, wherein the comparator controls the motor (22) to rotate upon sensing inequality in applied command signal and sensed flap code signal, and controls the motor to STOP when equality is sensed to thereby control display of commanded information.

3. Device according to claim 1, wherein the contact (23) are applied to the flaps in groups.

4. Device according to claim 1, wherein the drop flaps (18) comprise a metallic material coated with an insulating material, the contacts (23) being formed by non-insulated zones of the drop flaps.

5. Device according to claim 1 further comprising illumination means (26, 27) individually associated with said panels to illuminate the panel;

additional contacts located at further predetermined positions, in accordance with a second code, at the edges of the flaps;

and additional holding springs (19') located to engage said additional contacts, the additional springs being connected, individually, to the individual illumination means to provide an electrical circuit to illuminate the respective individual panels by the individual illumination means when the individual springs engage respective contacts of the respective panels.

6. Device according to claim 5, wherein the drop flaps (18) comprise a metallic material coated with an insulating material, the code markings (23) being formed by non-insulated zones of the drop flaps.

7. Device according to claim 5 wherein the contacts, and said additional contacts are applied to the flaps in groups, one group providing said flap code, and the other group providing said illumination circuit for the illumination means.

8. On-board automotive vehicular operating condition information display device comprising the display device of claim 1.

9. Device according to claim 8, wherein the drop flaps (18) comprise a metallic material coated with an insulating material, the contacts (23) being formed by noninsulated zones of the drop flaps.

10. Device according to claim 9, further comprising illumination means (26, 27) individually associated with said panels to illuminate the panel;

additional contacts located at further predetermined positions, in accordance with a second code, at the edges of the flaps;

and additional holding springs (19') located to engage said additional contacts, the additional springs being connected, individually, to the individual illumination means to provide an electrical circuit to illuminate the respective individual panels by the individual illumination means when the individual springs engage respective contacts of the respective panels.

* * * * *